Patented Jan. 12, 1954

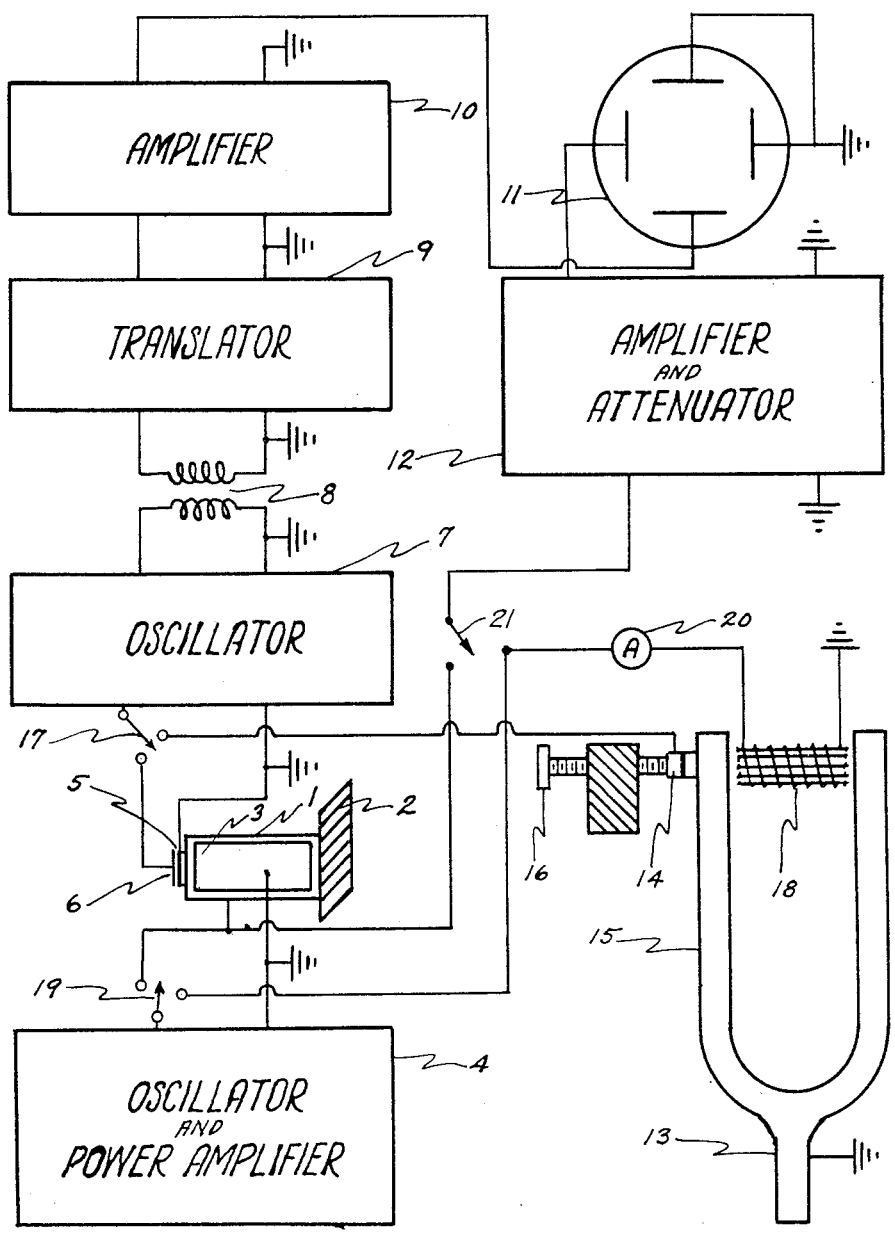

2,665,581

UNITED STATES PATENT OFFICE 2,665,581

DYNAMIC DISPLACEMENT METER

Clare H. Kean, Houston, Tex.

Application January 13, 1944, Serial No. 518,157

9 Claims. (Cl. 73—67)

This invention relates to a dynamic displacement meter and is one which enables quick and easy measurements of certain properties of rapidly vibrating bodies.

In the past, it has been found most difficult in the case of rapidly vibrating bodies to measure the amplitude of such vibrations in terms of the applied forces which cause them. It often becomes very important to determine this relationship and particularly to know how much the displacement lags behind the applied force.

As a consequence, one of the objects of the invention is a device to measure the displacement of a vibrating body as a function of the applied forces, whether they be mechanical or electrical. Since the device is particularly desirable for measuring displacements of high frequencies, which may be very minute, it is an exceptionally valuable tool in such fields as aircraft stress analysis, piezo-electric crystal design and as a means for measuring certain transient effects on such things as shock excited machinery and materials which are exposed to explosive impulses.

Another object of the invention is a device capable of measuring the shape of the hysteresis curve when the force applied to a vibrating body is plotted against displacement, particularly when the frequencies of vibration are 10 kilocycles and higher and the displacements are minute. Likewise it is of great value when the forces or loading causing such displacement are very small.

A further object of my invention is a device, which has no electrical feedover, for measuring the displacement of vibrating bodies in terms of the forces applied to them.

A still further object of my invention is a device for measuring displacement of a body in terms of the force causing such displacement in which the body serves as one plate (or at least supports one plate) of a condenser which determines the frequency of oscillation of an oscillator.

And yet another object of my invention is a device which measures the displacement of a vibrating body, such as a piezoelectric crystal, in terms of the applied force which consists of means for applying the displacement and applied force on the two axes of a cathode-ray oscillograph.

An even further object of my invention is a measuring device of the character described, which utilizes the principle of frequency modulation, and may be used in the place of conventional seismometers and strain gauge.

And still another object of my invention is a device which measures the displacement of a vibrating body, such as a piezoelectric crystal, in terms of the applied forces, which device is frequency modulated and contains means including a tuning fork for calibrating purposes.

The invention disclosed herein finds wide application in fields in which it is necessary to determine small displacements in terms of the varying actuating forces, although it is particularly valuable in such fields as stress or explosive analysis. The particular application stressed herein will be one which enables the measurement of the displacement of piezoelectric crystals in the terms of their applied voltages. However, it will be obvious to those skilled in the art that the vibrational qualities of any other member may be studied by simply applying a voltage proportional to the applied force on the deflection plates of a cathode-ray oscillograph.

Piezoelectric crystals, particularly Rochelle salt, are possessed of well-known peculiar qualities. These peculiar physical qualities are most important in the study of transducers and it has been found to be most helpful to compute the performance of such transducers from a knowledge of such fundamental physical qualities. One of the most important of these factors on which little work has been done is the measurement of the strain or displacement as a function of the applied field or voltage. This is particularly true when it is considered that such crystals possess peculiar hysteresis properties with respect to polarization versus field. Consequently it is reasonable to suppose and is found to be true that strain or displacement has some similar characteristic.

However, any device which is utilized to measure these quantities must have certain specifications: (1) it must be able to respond to frequencies of 10 kilocycles and higher; (2) it must measure strains of the order of $10^{-4}$ to $10^{-8}$ centimeters; (3) there must be no electrical feedover; and (4) the loading on the crystals should be very small. I have discovered that an apparatus which seems to satisfy these conditions is a frequency-modulated device. It consists principally of a stationary plate associated with another small plate which is mounted on the crystal or body whose characteristics are to be measured. These plates are separated by a distance of only several mils and serve as a condenser in the frequency determining circuit of a conventional frequency-modulated oscillator, whose frequency is usually in the range of 20 to 25 megacycles.

The frequency determined by this system is fed through a conventional frequency-modulation receiver and the demodulated signal is then amplified by a flat amplifier and placed on the vertical axis of an oscillograph. The voltage driving the crystal is placed on the horizontal axis of the same oscillograph and a plot of displacement versus applied voltage is thus obtained.

The single figure of the drawing is a schematic block diagram of my invention.

The body 1, whose characteristics are to be measured, is mounted on a fixed platform 2. In the drawing a crystal has been illustrated as such an object. Electrodes 3 (only one of which can be seen) are fixed to its faces and are connected to a variable oscillator (and power amplifier) 4. At the end of the body's vibrating dimension, there is fixed a small plate 5, which in the case of a piezoelectric crystal, may be a small piece of gold leaf glued to the end. This plate or gold leaf, 5 and another small fixed metal plate 6 act as a condenser and are connected to oscillator 7, which may be of the conventional Hartley type consisting of 7A46 vacuum tubes. It also contains a buffer stage, which may consist of 6J5 vacuum tubes, serving to isolate the oscillator from any effects produced by the circuit which follows. The oscillator 7 is coupled by means of a transformer 8 to a translator 9, which may conveniently be a General Electric Translator (JFM90). This translator serves to translate the frequency-modulated signal into one which is amplitude-modulated and thereby applies a voltage proportional to frequency deviations from the normal carrier frequency to the amplifier 10. After the signal is amplified it is placed on the vertical axis of an oscillograph 11.

Thus it is seen that the capacity between the gold leaf 5 and the small plate 6 serves as the variable capacitance in the oscillator and thus produces proportional variations in the oscillator frequency. The electrical oscillations are then fed through the buffer stage to the translator 9, which demodulates the signal and puts the resultant voltage, after amplification, on the vertical axis of the oscillograph.

The horizontal axis of the oscillograph 11 is controlled by the original driving voltage of the crystal through an attenuator and flat amplifier 12. It is very necessary that amplifiers 10, 12 be flat in their response and they should preferably be identical. This flatness of response should extend through a very wide range, as for instance, from 30 to 100,000 cycles, since they will be required to amplify the tuning fork frequencies, which are low, as well as the frequencies of vibration of the body which may be in the megacycle range; and is required because the signals from the fork and the oscillator 7 are ultimately compared on the oscillograph 11, after being amplified by the same amplifier. Also if hysteresis is present there may be very low component frequencies in the vibration of the body.

The fact that the oscillator 7 operates in the megacycle range, while the resonant frequency of the body will normally be in the kilocycle range, is responsible for maintaining feedback at a minimum. The megacycle frequencies are so high that if fed back to the body they are of no effect because its inertia is so tremendous and cause no difficulty in the operation of my invention.

An electrically driven calibration tuning fork, generally designated 13 is also used with the system. A small metal plate 14 is mounted very close to one of the prongs 15 of the fork. This plate is fixed to a differential screw 16, so that it may be adjusted and held fixed in any position. It is positioned very near to the end of the prong 15 of the fork and is arranged so that the electrical capacity between the plate 14 and the prong 15 is the same as that between the plate 6 and the electrode 5 described above, when the intervening distances are equal.

Plate 14 is connected to the input of the oscillator 7 by means of switch 17. The magnetic core 18, which drives the fork is connected by means of a similar switch 19 to the output of the oscillator 4 through ammeter 20. It will be noted that both the magnetic core 18 and the tuning fork 13 are grounded, which effectively puts the tuning fork and the output of the oscillator and power amplifier 4 at the same potential. Switch 21 is provided so that the voltage being applied to coil 18 from oscillator 4 may be applied across the horizontal plates of oscilloscope 11.

In operation, since the fork 13 is used to determine the amplitude of motion of the unit being tested, an absolute calibration of the fork is necessary. This is possible since, as has been stated, the plate 14 and the prong 15 act as a condenser having the same capacity as the condenser composed of plate 6 and leaf 5. In order to obtain a measure of the amplitude of the fork, its motion, or that of the prong, may be observed with a microscope having vertical illumination and a calibrated eye piece. With the current driving the fork set at a fixed value, the oscillator 4 is gradually tuned until the motion of the fork reaches a maximum. This point may be difficult to observe and requires considerable practice, but it is possible to get reproducible results. The difficulty is due to the "fluttering" or "beating" of the fork, which is caused by the non-linear terms of the driving force. If the polarizing current is made great, this "fluttering" effect is reduced, and I have found in practice that a polarizing current of one ampere works very successfully. As will be described, the calibration curve of the fork is found to be linear, which makes extrapolation accurate.

In practice, the unit to be tested is fixed in place and the oscillator 4 is turned on, which sets the body 1 in motion. The translator 9 is then tuned until a figure is visible on the oscillograph. If for a range of tuning, the figure remains essentially fixed, then it can be assumed that a sufficient number of side bands are getting through the system to give reproduction. If the reproduction is not good, the distance between the plate 6 and foil 5 is increased and the hysteresis pattern on the oscillograph is then observed (and perhaps photographed).

The oscillators 4 and 7 are then shifted by means of switches 19 and 17 to the fork 13. The switch 21 is also shifted so that the voltage across coil 18 being applied from oscillator 4 is placed on the horizontal plates of oscilloscope 11, and no voltage is placed across plates 3. In this connection, it should be observed that it may be necessary to move the oscillator bodily to a position near the fork as the distributed capacity between the various leads must be reduced to a minimum. Otherwise, its sensitivity is reduced and the carrier frequency may be changed.

The plate 14 is then adjusted by means of the differential screw 16 until the translator 9 indicates that oscillator 7 is operating at the same frequency as it was when the vibrating body was being observed. Since this determines that the carrier frequencies are equal, the fork is now driven by oscillator 4 such that its vibration displacement is equal to that observed when the body 1 was vibrating, and the value of the current through ammeter 20 is recorded. This is obviously done by observing that the vertical deflection on the oscillograph is the same as was observed when the body was vibrating. Because the respective capacities in the two systems are, by definition, equal and the areas of the plates have been made equal, it is now known that the percentage changes in the capacities, due to the vibration, are equal and consequently, that the vibrational displacements are also equal. Since the displacement of the fork is known or may be determined, the displacement of the vibrating body is also known.

With respect to the vibration of the fork, it has been shown by experiment that its amplitude of vibration is proportional to the driving force or current. This curve can easily be plotted in the observable range with the assistance of the microscope described above. Since the curve is linear, extrapolated values may be obtained in the region in which the amplitude of the fork may be difficult to observe visually, if the value of the driving current is known.

The determination of the displacement-applied voltage characteristic is easily obtained from the figure on the oscillograph. The amount by which the displacement lags the applied voltage determines the shape of the figure and its variation from a straight line figure, which would indicate no lag. Similarly, the hysteresis curve is shown on the cathode ray oscillograph.

Obvious modifications of the invention make it possible to study many other periodic displacement effects in terms of the forces causing them. For instance, if the body does not exhibit piezoelectric characteristics the forces causing the displacement may be represented on the horizontal sweep of the oscillograph. Any convenient method (whether it be electric, mechanical, magnetic or optical) which will supply voltages proportional to the applied forces may be utilized without materially altering the invention.

The discussion thus far has been somewhat limited to using the invention for the study of vibration in connection with the actuating forces. Valuable information is also obtained about transient effects of high frequency vibration, shock, or explosions on a variety of bodies. In this case, the effects are readily observable with respect to time on the oscillograph, if the displacement with respect to the applied forces is of no interest.

Two precautions should be noted with respect to the design and use of the invention. First, the frequency of the oscillator 7 must be very nearly a function of the displacement and second, the frequency-modulated signal, which in most cases includes numerous side bands must be able to pass through the translator 9. A mathematical analysis of the amplitude of such side bands in terms of the modulation index is difficult because the modulation index is hard to find. However, it is very easy, as was described in connection with the operation, to determine whether this last condition is satisfied.

The first condition can be satisfied without any great effort and may be illustrated as follows: Assume that the distance between the plates of the condenser (which are circular) is much less than their diameter and that $A$ = area of the condenser plate
$e$ = distance of separation of the plates when stationary
$\Delta e$ = change of distance between the plates during vibration
$f_o$ = frequency of oscillator 7 when the plates are stationary
$f_{max}$ = frequency of oscillator 7 when the distance between the plates is $e + \Delta e$
$L$ = the inductance of the oscillating system When the plates are stationary, the following expression is valid:

$$f_o = \frac{1}{2\pi \sqrt{\frac{LA}{4\pi e}}}$$

and the change in frequency is $$\Delta f_o = f_{max} - f_o = \frac{1}{2\pi}\left[\frac{1}{\sqrt{\frac{LA}{4\pi(e+\Delta e)}}} - \frac{1}{\sqrt{\frac{LA}{4\pi e}}}\right]$$

or $$\Delta f_o = \frac{\sqrt{4\pi}}{2\pi\sqrt{LA}} \cdot (\sqrt{e+\Delta e} - \sqrt{e})$$

If the linear law is actually valid, the following expression, by taking the first derivative of the equation in lines 13 and 14 supra, is approximately accurate to give the theoretical change in frequency $$\Delta f_o' = \frac{1}{\sqrt{4\pi}} \cdot \frac{\Delta e}{\sqrt{e}} \cdot \frac{1}{\sqrt{LA}}$$

The deviation from the linear law is now seen to be $$k = \frac{\Delta f_o - \Delta f_o'}{\Delta f_o} = \frac{\sqrt{e+\Delta e} - \sqrt{e} - \Delta e/2\sqrt{e}}{\sqrt{e+\Delta e} - \sqrt{e}}$$

or $$k = 1 - \frac{\Delta e}{2e\left(\sqrt{1+\frac{\Delta e}{e}} - 1\right)}$$

If the ratio of the change of distance between the plates to the stationary distance is equal to R $$R = \frac{\Delta e}{e}$$

Substituting $$k = 1 - \frac{R}{2(\sqrt{1+R} - 1)}$$

and $$R = 4k(k-1)$$

$$\frac{R}{4} = k(k-1)$$

From this expression it is seen that for small values, the deviation from the linear law is about one quarter of the ratio of the change in separation of the plates to the stationary distance between them. Since it is not difficult to maintain this last ratio at a value less than 4 percent, the percentage deviation from the linear law can easily be maintained below one percent.

Thus, the present invention finds exceedingly wide application in the measurement field. The device is capable of accurately measuring many kinds of displacements and particularly those which are minute and of high frequency, which may be very different than the dispacements caused by the same exciting forces operating at lower frequencies.

I claim:

1. A dynamic displacement meter for measuring displacements of a body vibrating in response to the application of electrical force thereto comprising: a frequency-modulated oscillator; a condenser connected in the frequency determining circuit of said oscillator; one plate of said condenser being fixed and the other plate being fixedly mounted on said body; a set of plates pressing against said body, means to apply vibration force to said plates, and means for indicating the variations in frequency of said oscillator when said other plate and said body vibrate.

2. In the device described claim 1, said means including a cathode ray oscillograph.

3. A dynamic displacement meter for measuring displacements of a body comprising, a high frequency oscillator, a frequency modulator for said high frequency oscillator including a condenser, one of the plates of the condenser being mounted for movement with the body so that the high frequency oscillator current is modulated in accordance with the movement of the body, a translator for changing the frequency modulated currents to amplitude modulated currents, an amplifier for amplifying the amplitude modulated currents over a wide frequency range connected to the vertical deflection plates of a cathode ray oscillograph to deflect the beam proportionally to the displacement of the body, an oscillator and power amplifier for supplying the force acting to drive the body, and an attenuator and amplifier for placing a portion of the output of the power amplifier on the horizontal deflection plates of the oscillograph.

4. A dynamic displacement device for measuring displacements of a body comprising, means forming a high frequency oscillator, means forming a frequency modulator for said high frequency oscillator including a condenser in which one of the plates is mounted for movement with the body in order that the high frequency current be modulated in accordance with the movement of the body, means for changing the frequency modulation to amplitude modulation, means for amplifying the amplitude modulation, means forming an oscillograph for indicating the displacement of the body, means forming an oscillator and power amplifier for vibrating the body, and means forming an attenuator and amplifier for placing a portion of the driving power on the indicating means.

5. A dynamic displacement meter for measuring displacements of a vibrating body comprising a frequency modulated oscillator, a condenser connected in a frequency determining circuit of the oscillator, one of the plates of said condenser being mounted for movement with said body, the other plate being relatively fixed, said movement causing variation in capacitance of said condenser and resulting in variation of frequency of said oscillator, means to apply vibrating force to said body, translator means which produces an amplitude modulated signal proportional to variation in frequency of said oscillator, indicator means, an electrical connection to said indicator means from said translator means, and an electrical connection to said indicator means from said means to apply vibrating force, whereby said indicator means produces an indication proportional to both said vibrating force and said movement.

6. Apparatus for measuring the displacement of a body comprising means to apply a displacing force to said body, a signal generator to produce a carrier wave, means to convert said displacement into a change of circuit constants in said signal generator whereby said carrier wave is modulated, means connected to said generator and responsive to said modulated wave, indicator means, means to tap off from said force applying means a voltage proportional to said force, a connection between said indicator means and said tap off means, a connection between said indicator means and said means responsive to said modulated wave, said indicator means thereby producing an indication proportional to both said displacing force and said displacement.

7. A dynamic displacement meter for measuring displacements of a body vibrating in response to the application of electrical forces thereto comprising; a frequency-modulated oscillator; a first condenser connected in the frequency determining circuit of said oscillator, one plate of said condenser being fixed and the other plate being fixedly mounted on said body; means for indicating the modulation in frequency of said oscillator when said other plate and said body vibrate; a standard vibration element whose rate and amplitude of vibration is known, means forming a second condenser in which one plate is mounted on the said vibration element and the other plate is adjustably positioned, means to substitute said second condenser for said first condenser in the said frequency determining circuit, whereby the capacitance of said second condenser may be adjusted until said indicator means signifies that modulation in frequency of said oscillator is identical with the modulation when said first condenser was in said circuit.

8. A dynamic displacement meter for measuring displacements of a vibrating body comprising a frequency modulated oscillator, a first condenser connected in a frequency determining circuit of the oscillator, one of the plates of said condenser being mounted for movement with said body, the other plate being fixed, said movement causing variation in capacitance of said condenser and resulting in variation of frequency of said oscillator, means to apply vibrating force to said body, translator means which produce an amplitude modulated signal proportional to variation in frequency of said oscillator, indicator means, an electrical connection to said indicator means from said translator means, an electrical connection to said indicator means from said means to apply vibrating force, said indicator means producing an indication proportional to both said vibrating force and said movement, a standard vibration element whose rate and amplitude of vibration is known, means forming a second condenser in which one plate is mounted on the said vibration element and the other plate is adjustably positioned, means to substitute said second condenser for said first condenser in the frequency determining circuit whereby the capacitance of said second condenser is adjusted until said indicator means signifies that variation in oscillator frequency is identical with the variation when said first condenser was in the said circuit.

9. Apparatus for measuring the displacement of a body comprising means to apply a displacing force to said body, a signal generator to provide a carrier wave, detector means to convert said displacement into a change of circuit constants in said signal generator whereby said carrier wave is modulated, means connected to said generator and responsive to said modulated wave, indicator means, means to tap off an electrical potential proportional to said force, a connection between said indicator means and said tap off means, a connection between said indicator means and said means responsive to said modulated wave, said indicator means producing an indication proportional to both force and displacement, a standard vibrating element whose rate and amplitude of vibration is known, adjustable means connected to said signal generator and to said element whereby displacement of said element may be converted into change of circuit constants in said signal generator, said adjustable means capable of being substituted for said detector means so that said indicator means signifies carrier wave modulation identical to that caused by said detector means.

CLARE H. KEAN.

References Cited in the file of this patent

UNITED STATES PATENTS

| Number | Name | Date |
|---|---|---|
| 1,599,922 | Rathbone | Sept. 14, 1926 |
| 1,635,787 | Hort | July 12, 1927 |
| 1,652,525 | Hahnemann et al | Dec. 13, 1927 |
| 1,693,806 | Cady | Dec. 4, 1928 |
| 1,841,459 | Taylor | Jan. 19, 1932 |
| 2,025,719 | Blau et al. | Dec. 31, 1935 |
| 2,208,091 | Zakarias | July 16, 1940 |
| 2,240,278 | Abbott | Apr. 29, 1941 |
| 2,309,560 | Welty | Jan. 26, 1943 |
| 2,329,835 | Hope et al. | Sept. 21, 1943 |
| 2,361,396 | Gross | Oct. 31, 1944 |
| 2,361,648 | Petty | Oct. 31, 1944 |
| 2,371,373 | Badmaieff | Mar. 13, 1945 |
| 2,394,455 | Koch | Feb. 5, 1946 |
| 2,412,240 | Williams et al. | Dec. 10, 1946 |

FOREIGN PATENTS

| Number | Country | Date |
|---|---|---|
| 470,454 | Germany | Jan. 15, 1929 |
| 399,845 | Great Britain | Oct. 13, 1933 |